Figure 1:
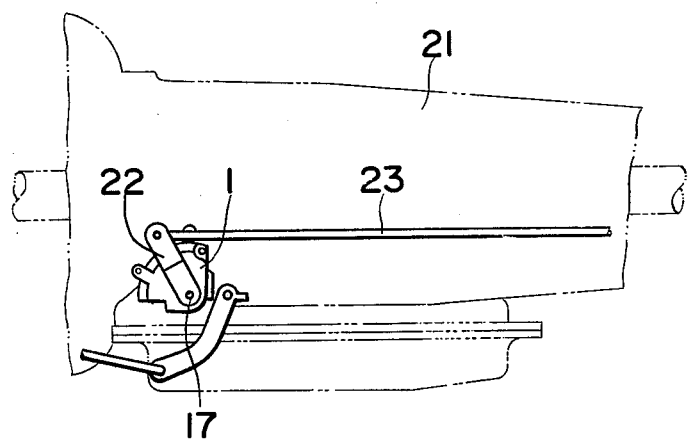

United States Patent [19]

Hayashi et al.

[11] 3,939,313

[45] Feb. 17, 1976

[54] ROTARY SWITCH ASSEMBLY HAVING FIXED CONTACTS WHICH MAY BE SELECTIVELY SEGMENTED

[75] Inventors: Yoshikazu Hayashi, Gifu; Mitsuo Sato, Aichi, both of Japan

[73] Assignee: Kabushiki Kaisha Tokai Riki Denki Seisakusho, Japan

[22] Filed: May 20, 1974

[21] Appl. No.: 471,562

[30] Foreign Application Priority Data

July 23, 1973   Japan............................ 48-87036[U]

[52] U.S. Cl. ............ 200/11 J; 200/61.89; 200/275
[51] Int. Cl.² .................... H01H 21/62; H01H 1/06
[58] Field of Search .......... 200/11 C, 11 EA, 11 G, 200/11 J, 16 C, 16 D, 11 E, 11 K, 61.85–61.89, 252, 276

[56] References Cited
UNITED STATES PATENTS

| | | |
|---|---|---|
| 3,439,325 | 4/1969 | Leichsenring................ 200/61.89 X |
| 3,442,004 | 5/1969 | Schink........................ 200/11 J UX |
| 3,531,603 | 9/1970 | Ashman ..................... 200/11 J UX |
| 3,602,656 | 8/1971 | Graddy et al................ 200/16 C X |

*Primary Examiner*—James R. Scott
*Attorney, Agent, or Firm*—Craig & Antonelli

[57] ABSTRACT

A rotary switch of sliding contact type for use in a torque converter of an automotive vehicle comprises a base in the surface of which a plurality of stationary contact plates are molded, a cover plate for the base plate suitably secured to the latter with a space for movably enclosing a rotary contact arm between the cover plate and the base plate, and a rotatable shaft fixedly received in the hub of the rotary contact arm. The hub is rotatably held between edges of corresponding openings formed in the base plate and the cover plate, so that, upon rotation of the shaft, contacts of the rotary contact arm slide across the stationary contact plates and can be stopped at positions precisely corresponding to predetermined angles of rotation of the shaft.

9 Claims, 18 Drawing Figures

ROTARY SWITCH ASSEMBLY HAVING FIXED CONTACTS WHICH MAY BE SELECTIVELY SEGMENTED

The invention relates to a rotary switch, and more particularly to a rotary switch of sliding contact type for use in a torque converter of an automotive vehicle.

According to a conventional rotary switch of the kind which comprises a base plate having a plurality of stationary contact plates provided on the surface thereof, and a rotary contact arm which has corresponding contact points and which is fixed to a rotatable shaft for sliding across the stationary contact plates so that the movable contacts of the rotary contact arm can be selectively stopped at positions corresponding to predetermined angles of rotation of the rotatable shaft, erroneous functions of the rotary switch tend to occur due to erroneous angles of attachment of the contact arm relative to the rotatable shaft or to looseness of fixing between the contact arm and the shaft.

Furthermore, the positions of the stationary contact plates, especially distances between the individual neighboring contact plates must be very accurate, requiring utmost care and much time in the manufacture of rotary switches of such types. Although the surface of the base plate must be ground after the insertion of the stationary contacts plates for obtaining a flat surface, it is rather difficult to check whether the stationary contact plates still have sufficient thickness for durability even after the grinding, which makes it difficult to decide immediately whether the finished base plate is acceptable or to be rejected as a faulty product.

Accordingly, an essential object of the present invention is to provide a rotary switch which is accurately functioning with substantial elimination of the disadvantages inherent in the conventional rotatary switches.

Another important object of the present invention is to provide a rotary switch of the above described type which is simple in construction and easy to manufacture.

A still further object of the present invention is to provide a rotary switch of the above described type which has durable stationary contacts with sufficient thickness for a prolonged life of the rotary switch.

According to a preferred embodiment of the present invention, the rotary switch comprises a sector shaped base plate of insulating material in the surface of which a plurality of stationary contact plates are molded, a cover plate of similar shape suitably secured to the base plate, providing a space therebetween for movably enclosing a rotary contact arm, and a rotatable shaft which is fixedly received in a hub of the rotary contact arm, while the hub of the rotary arm is rotatably held between edges of the corresponding openings formed in the base plate and the cover plate. The hub has a portion which projects, to a certain extent, out of the cover plate and is threaded at the outer periphery thereof for receiving a tapered nut. The projecting portion of the hub is centrally bored to provide an approximately rectangular opening and is also provided, at the extreme end thereof, with two grooves which cross at right angles to each other at the axis of the hub. The distal portion of the rotatable shaft is formed to have a rectangular cross section corresponding to the rectangular opening of the hub. Consequently, after the distal portion of the shaft is rather loosely inserted into the hub with the tapered nut engaged with the projecting portion of the hub to a certain extent, the shaft is fixedly connected to the hub by merely tightening the tapered nut.

Furthermore, since the direction of the rectangular opening of the hub is in agreement with that of the rectangular cross section of the shaft, alignment of both can be made very easily.

According to the rotary switch of the present invention, the stationary contact plates for the base plate are formed as a single plate by press stamping, in which the single plate individual contact plates are connected by narrow edges of a plurality of openings formed between neighboring contact plates. The single plate for the stationary contact plates is molded in the base plate of insulating material, after which the narrow edges of the openings are cut off by making holes therein with larger diameters than the widths of the edges to form independent stationary contacts. Such a single plate may be prepared for the required of rows of stationary contact plates for the base plate. In this manner, very accurate positioning of each stationary contact is readily achieved. Furthermore, the single plate for the stationary contact plates is provided with a plurality of marking dints which are less than the thickness of the plate and which are very effective in for detecting the depth of grinding in surface finishing of the base plate with the stationary contact plates molded therein.

Figure 2:
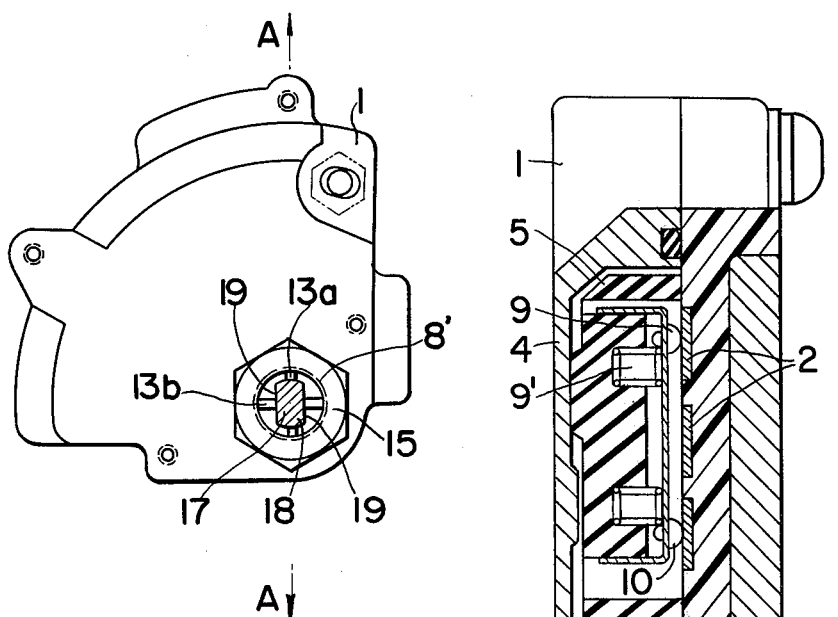
Figure 3:
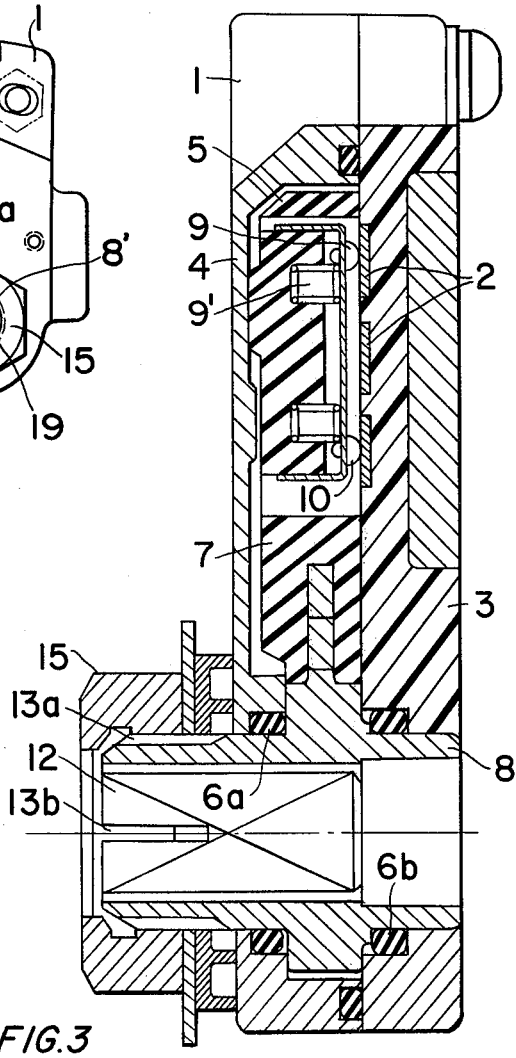
Figure 4:
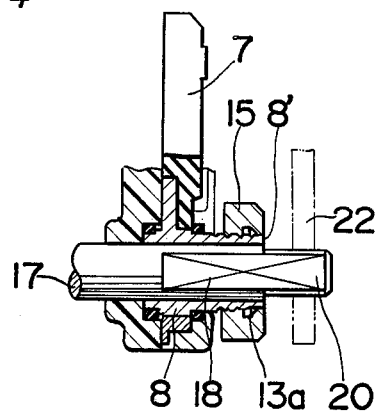
Figure 5:
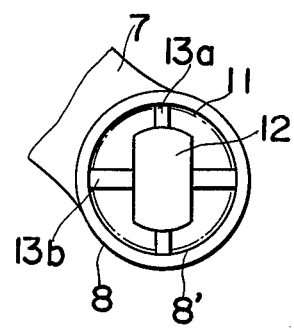
Figure 6:
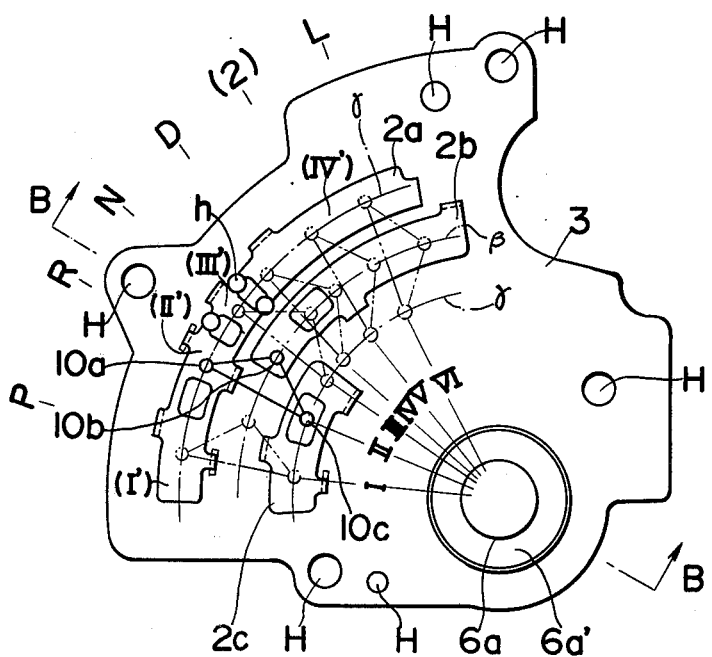
Figure 7:
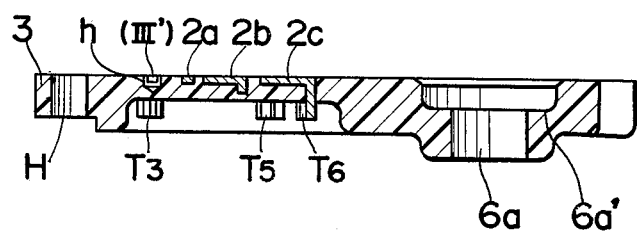
Figure 8:
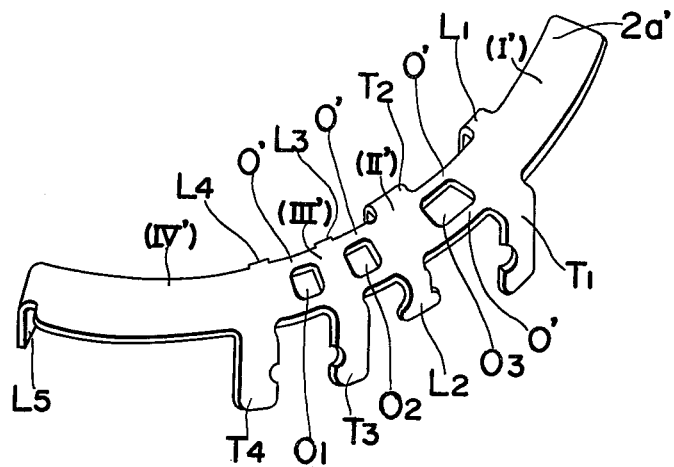
Figure 9:
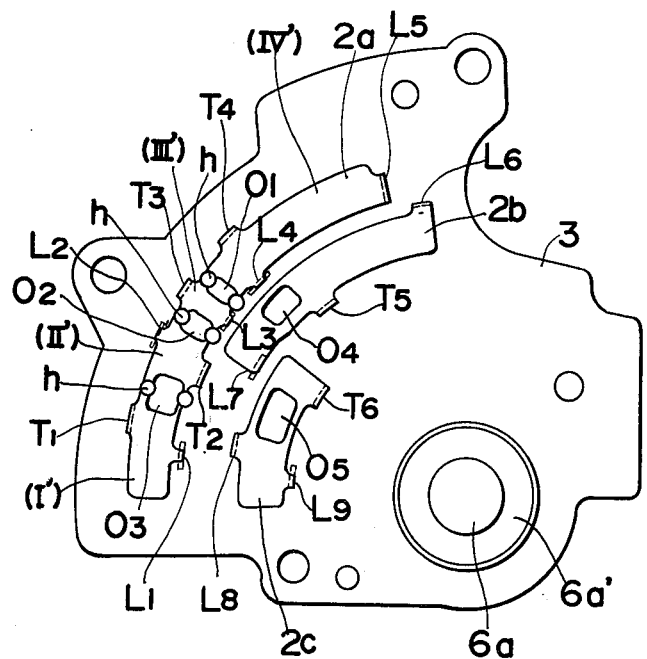
Figure 13:
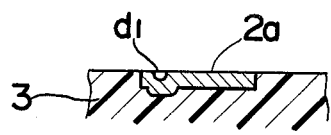
Figure 10:
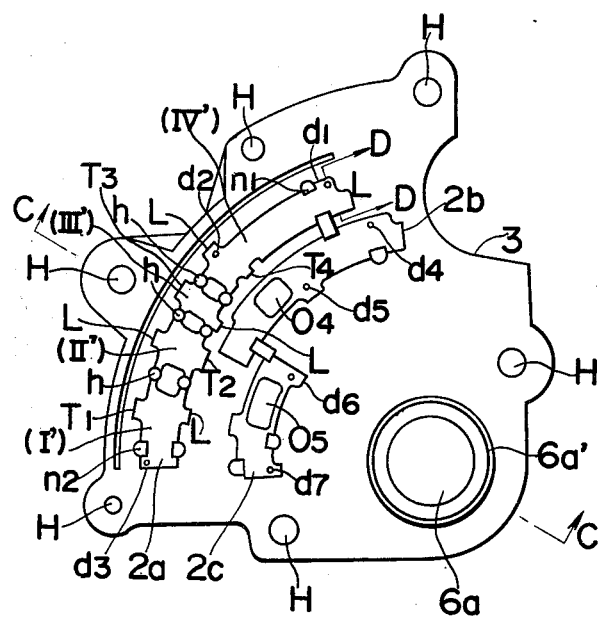
Figure 11:
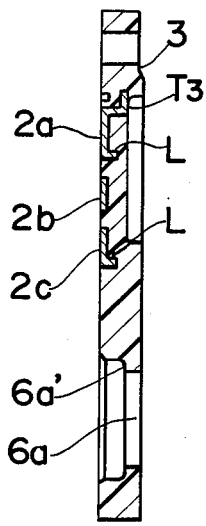
Figure 12:
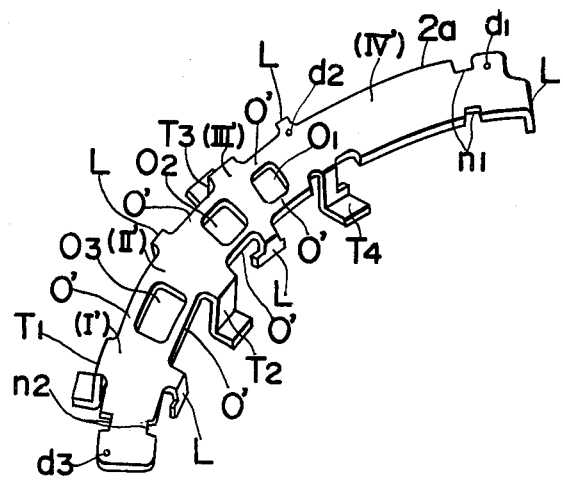
Figure 14:
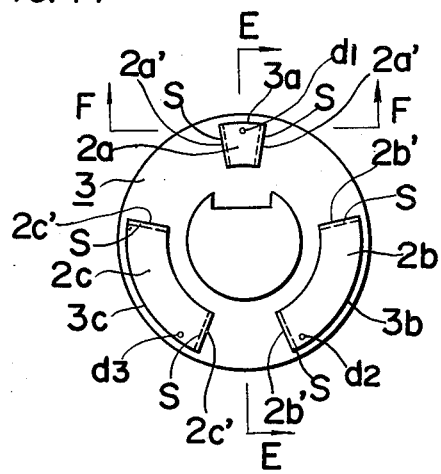
Figure 15:
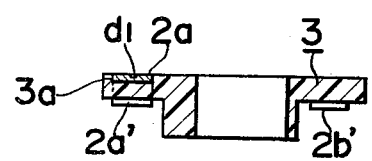
Figure 16:
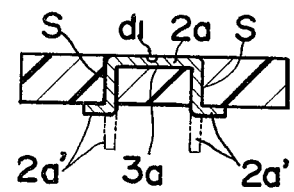
Figure 17:
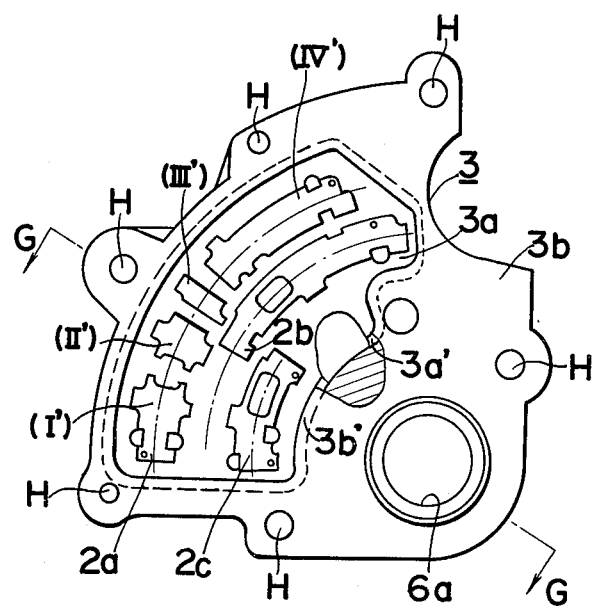
Figure 18:
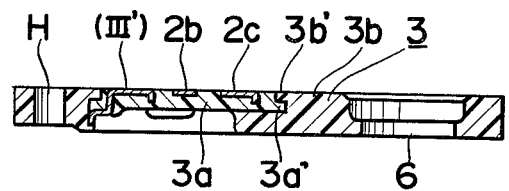

These and other objects and features of the present invention will become apparent from the following description taken in conjunction with the preferred embodiment thereof with reference to the accompanying drawings, in which;

FIG. 1 is a schematic top plan view of the rotary switch of the invention as applied to a torque converter of an automotive vehcle, FIG. 2 is a top plan view of the rotary switch of the invention, FIG. 3 is a cross sectional view taken along the line A — A in FIG. 2, but with a shaft and a nut disengaged, FIG. 4 is a similar view to FIG. 3, but particularly shows connection between the shaft and a hub of a rotary contact arm employed in the rotary switch of FIG. 1, FIG. 5 is a top plan view, on an enlarged scale, of the hub of the rotary contact arm employed in the switch of FIG. 1, FIG. 6 is a top plan view of a base plate of the rotary switch according to the present invention, FIG. 7 is a cross sectional view taken along the line B — B in FIG. 6, FIG. 8 is a perspective view of a stationary contact plate employed in the base plate of FIG. 6, FIG. 9 is a similar view to FIG. 6, but particularly shows positioning of each stationary contact paltes, FIG. 10 is a top plan view of a base plate of a rotary switch according to a 1st modification of the invention, FIG. 11 is a cross sectional view taken along the line C — C in FIG. 10, FIG. 12 is a perspective view of a stationary contact plate employed in the base plate of FIG. 10, FIG. 13 is a cross sectional view taken along the line D — D in FIG. 10, FIG. 14 is a top plan view of a base plate of rotary switch according to a 2nd modification of the invention, FIG. 15 is a cross sectional view taken along the line E — E in FIG. 14, FIG. 16 is a cross sectional view taken along the line F — F in FIG. 14 on an enlarged scale, FIG. 17 is a top plan view of a base plate of a rotary switch according to a 3rd modification of the invention, and FIG. 18 is a cross sectional view taken along the line G — G in FIG. 17.

Before the description of the present invention proceeds, it is to be noted that like parts are designated by like reference numerals throughout the several views of the accompanying drawings.

Referring to FIGS. 1 through to 9, the rotary switch 1 of the sliding contact type of the present invention is applicable, for example, to a torque conventer 21 of an automotive vehcle, and is connected for operation, through a rotatable shaft 17 for a rotary contact arm 7 of the switch 1 and a lever 22 which is pivotally connected to the shaft 17 at one end and to a rod 23 at the other end thereof with the rod 23 in turn connected to an operating handle (not shown) provided in the driver's seat.

The switch 1 generally comprises a sector shaped base plate 3 of insulating material in the surface of which a plurality of stationary contact plates 2 mentioned later are provided, a cover plate 4 of a similar shape suitably secured to the plate 3 which forms, therebetween, a cavity or recess 5 for movably enclosing the rotary contact arm 7, and the rotatable shaft 17 which is fixedly received in a hub 8 integrally formed with the rotary contact arm 7, while the hub 8 is rotatably held between edges of the openings 6a and 6b formed at corresponding portions of the sector shaped base plate 3 and cover plate 4 in a manner mentioned below. The rotary contact arm 7 of insulating material is further provided, at the undersurface thereof, facing the stationary contact plates 2, with a contact metal piece 9 having a plurality of contact points 10 which are urged into slidable contact with the stationary contact plates 2 by means of compression springs 9' suitably held between the arm 7 and the metal piece 9.

The slidable contacts 10 of the rotary arm 7 are adapted to slide across the stationary contact plates 2 so as to connect the required contacts at positions associated with the corresponding operating positions P, R, N, D, (2), or L of the operating handle for the torque converter (not shown).

Referring particularly to FIGS. 3 to 5, the hub 8 of the arm 7 into which the shaft 17 is to be fixedly received is formed to project out of the cover plate 4 to a certain extent as in FIG. 3 with the outer periphery of the projecting portion 8' threaded as at 11 for receiving a tapered nut 15. The projecting portion 8' is centrally bored to provide an approximately rectangular opening 12 communicating with the opening 16 of the hub 8 for receiving rather loosely a distal portion 18 of the shaft 17 with the portion 18 having corresponding rectangular cross section. The projecting portion 8' is also provided at the extreme end thereof, with two grooves 13a and 13b which are parallel to sides of the rectangular opening 12 and cross at right angles to each other in the same plane at the axis of the hub 8 as in FIG. 5.

The distal portion 18 of the shaft 17 having a rectangular cross section is formed by providing two flat surfaces 19 which are parallel to each other and to the axis of the shaft 17 at the portion 18 which is further narrowed at the extreme end thereof to form a smaller rectangular cross sectional portion 20. The smaller rectangular portion 20 is adapted to project from the grooved end of the projecting portion 8' of the hub 8 to such an extent that the portion 20 is sufficiently long to receive one end of the lever 22.

Since the rectangular opening 12 in the projecting portion 8' of the hub 8 is similar in cross sectional shape to the distal portion 18, the thickness of the wall of the opening 12 is thin in the direction of the short sides and thick in the direction of long sides for the rectangular opening 12. As the grooves 13a and 13b are intended to flexibly reduce the diameter of the portion 8' when the latter engages the tapered nut 15, irregular thickness of the wall of the opening 12 results in uneven bending of the wall upon engagement with the nut 15. In this embodiment, considerations have been given to eliminate such uneven bending of the wall of making the width of the groove 13a narrow in the thin wall portion and that of the groove 13b wide in the thick wall portion. Since the rectangular cross section portion 18 of the shaft 17 is formed in the similar shape and direction to the rectangular opening 12 in the projecting portion 8' of the hub 8, the portion 18 of the shaft 17 is loosely inserted into the opening 12, after which the tapered nut 15 is threaded into the projecting portion 8' for forcibly narrowing the width of the grooves 13a and 13b so that the inner face of the rectangular opening 12 is pressed closely against the outer surface of the distal portion 18 of the shaft 17 with the shaft 17 firmly secured to the hub 8 of the contact arm 7.

In the above embodiment, angular alignment between the shaft 17 and the contact arm 7 is very easily made while the former is rigidly secured to the latter in the manner as described above, which fact is extremely useful for a switch in which angular positions for the rotary contact arm to be stopped must be in exact agreement with the angles of rotation of the rotatable shaft.

Furthermore, since the rectangular opening 12 is similar in shape to the distal portion 18 of the shaft 17 and the latter is adapted to be rather loosely received in the former with the tapered nut 15 threaded to the projecting portion 8' to a slight extent, both can be rigidly connected to each other very efficiently thereafter by merely tightening the nut 15.

Referring to FIGS. 6 to 9, the sector shaped base plate 3 of insulating material has an opening 6a for receiving at the edge 6a' thereof the hub 8 of the rotary contact arm 7, to which hub 8 the rotatable shaft 17 is fastened in the above described manner, a plurality of stationary contact plates 2a, 2b and 2b molded in the surface of the plate 3 so that the surfaces of the former are flush with the surface of the latter, and a plurality of holes H for securing screws (not shown). The shaft 17 is adapted to be selectively stopped at one of the angular positions P, R, N, D, (2) or L as it rotates, while three contacts 10a, 10b and 10c of the contact arm 7 (not shown), fastened to the shaft 17, stop at one of the corresponding positions (I) through (IV) each of which is in line with the above angular positions P, R, N, D, (2) or L of the shaft 17. The arcuate loci of the contacts 10a, 10b and 10c are shown by chain lines α, β and γ respectively.

The stationary contact plates 2a inserted on the plate 3 along the arcuate path α so as to correspond to the positions (I) to (IV) are initially formed as a single contact plate 2a' by a press work as in FIG. 8. The plate 2a is provided with openings $O_1$ to $O_3$ between contact plates (I)' and (II)', (II)' and (III)', and (III)' and (IV)' respectively which are connected by narrow edges O' of the openings $O_1$, $O_2$ and $O_3$. Tongue shaped terminal plates $T_1$, $T_2$, $T_3$ and $T_4$ which extend downward at right angles from the surface of the plate $2a'$ and which are longer, to a certain extent, than the thickness of the base plate 3 are formed along the arcuate edges of the plate $2a'$ at positions approximately corresponding to the angular positions P, R, N, D of the shaft 17. The plate $2a'$ is also provided, along the arcuate edges thereof, with a plurality of legs $L_1$ to $L_5$ to be molded in the base plate 3 which are shorter than the thickness of the base plate 3 and extend downward at right angles to the surface of the plate $2a'$ in the same manner as the terminals $T_1$ to $T_4$.

Referring particularly to FIG. 9, stationary contact plates $2b$ and $2c$ which are inserted and molded in the base plate 3 along the arcuate paths $\beta$ and $\gamma$ together with the plate $2a$ in FIG. 6 are formed also by a press stamping in the similar manner as for the plate $2a'$ and function as positive contacts for a power source. The plate $2b$ has an opening $O_4$ at a position corresponding to the position (III) of the contact, $10b$ of the arm 7 and is provided with a terminal $T_5$ of tongue shape and molded-in insertion legs $L_6$ and $L_7$. Similarly, the plate $2c$ is also provided with an opening $O_5$ at a position corresponding to the position (II) of the contact $10c$ of the arm 7 with a terminal $T_6$ and legs $L_8$ and $L_9$ formed in the similar fashion to the plates $2a$ and $2b$.

In the manufacture of the rotary switch 1 according to the present invention, the stationary contact plates $2a$, $2b$ and $2c$ are held in position by means of a molding tool and necessary jigs, and inserted in the base plate 3 to be molded from synthetic resin for integral molding, by which the openings $O_1$ to $O_5$ are filled up to form insulating surfaces, parallel to the surfaces to the plates $2a$, $2b$ and $2c$, while the terminals $T_1$ to $T_6$ project from the under surface of the base plate 3 to a certain extent with the legs $L_1$ to $L_9$ buried in the plate 3. Thereafter, the narrow edges O' (FIG. 8) of the openings $O_1$ to $O_3$ formed in the plate $2a$ are cut off by making holes h with somewhat larger diameters than the widths of the edges as in FIG. 9 so as to form electrically independent stationary contact plates (I)', (II)', (III)' and (IV)', which are for negative side contacts.

As is clear from the above description, since the stationary contact plates (I)' to (IV)' to be molded in the base plate 3 are initially formed as the single plate $2a'$ with each contact connected by the narrow edges O' of the openings $O_1$ to $O_3$, there is no possibility that any error occurs in the intervals between the contact plates (I)', (II)', (III)' and (IV)' along the arcuate path $\gamma$.

Furthermore, manufacturing of molding tool and jigs for insertion of the contact plates to the base plate is much simplified as in the case of inserting a single plate with each of the contact plates (I)' to (IV)' molded in the base plate 3 at extremely accurate intervals.

It should be noted that, by the above procedure, positioning of the other stationary contact plates $2b$ and $2c$ which are to be molded in concentric arcuate paths with the plate $2a$ is made very simply and correctly relative to the plate $2a$ by providing a datum line at a suitable position on the surface of the base plate.

Referring to FIGS. 10 to 13, there is shown a 1st modification of the embodiment in FIGS. 1 to 9. In this modification, each of the stationary contact plates $2a$, $2b$ and $2c$ are provided with a plurality of marking dints $d_1$ to $d_3$, $d_4$ and $d_5$, and $d_6$ and $d_7$ respectively which are formed on the surface thereof for detecting cut depth in surface grinding after the plates $2a$, $2b$ and $2c$ are molded integrally in the base plate 3, although other constructions are much the same as in the embodiment in FIGS. 1 to 9.

Referring to FIG. 12, the stationary contact plate $2a$ is initially formed as a single metal plate of copper or the like by a press stamping and provided with tongue like terminal plates $T_1$, $T_2$, $T_3$ and $T_4$ extending downwardly at right angles from the arcuate edges of the plate $2a$. The lower end of each of the terminal plates $T_1$ to $T_4$ is further bent outwardly at right angles to each surface of the terminal plates $T_1$ to $T_4$, and is adapted to project, to a certain extent, from the under surface of the base plate 3 for necessary electrical connections. The plate $2a$ is also provided with a plurality of legs L at the arcuate edges thereof which are shorter than the thickness of the base plate 3 for molded-in insertion. The marking dints $d_1$, $d_2$ and $d_3$ of small diameters are formed adjacent to opposite ends and at approximately middle portion of the plate $2b$, while a pair of notches $n_1$ and $n_2$ for positioning when inserting the plate $2b$ to the base plate 3 are formed on the edges of the plate $2b$ adjacent to opposite ends of the plate $2b$ as in FIG. 12. After the plate $2a$ has been molded in the base plate 3, the narrow edges O' of the openings $O_1$ to $O_3$ are cut off by making holes h of larger diameters than the widths of the edges O' to form independent contact plates (I)' to (IV)' in the same manner as in the 1st embodiment.

Thereafter, the surface of the base plate 3 with contact plates $2a$, $2b$ and $2c$ molded therein is ground for finishing so as to form a flat surface to an extent immediately before the marking dints $d_1$ to $d_7$ disappear. If a perfect flat surface is not obtained even after the marking dints $d_1$ to $d_7$ have disappeared, the base plate 3 is rejected as faulty product.

Referring now to FIGS. 14 to 16, there is shown a 2nd modification according to the present invention. In this 2nd modification, the flange shaped base plate 3 molded from synthetic resin has a plurality of comparatively shallow concave portions $3a$, $3b$ and $3c$ formed on the surface thereof along the circumference of the plate 3, while each of the segment shaped concave portions $3a$, $3b$ and $3c$ is provided with vertical slits S at opposite ends thereof. Stationary contact plates $2a$, $2b$ and $2c$, each of which has a surface portion fitting in the corresponding concave portion $3a$, $3b$ to $3c$ and is provided with legs $2a'$, $2b'$ or $2c'$ at opposite ends thereof formed by bending the plate at right angles to its surface, are inserted into the corresponding concave portions $3a$, $3b$ and $3c$ through the slits S, after which the projecting ends of the legs $2a'$. $ab'$ and $2c'$ are further bent outwardly at right angles to the surface of the legs for fixing the plates $2a$, $2b$ and $2c$ to the base plate 3 as shown in FIG. 16.

It should be noted here that each of the contact plates $2a$, $2b$ and $2c$ is provided with a marking dint $d_1$, $d_2$ or $d_3$ which is within the thickness of the base plate.

In this modification also, the base plate 3 with the stationary contact plates $2a$, $2b$ and $2c$ inserted and fixed thereto as above is ground for obtaining a flat surface as in the 1st embodiment, and if the perfect flat surface can not be obtained even after the disappearance of the marking dints, the base plate is rejected as defective.

In the above 1st and 2nd modifications, when the surface grinding for finishing is carried out on the base plate 3 with stationary contact plates molded or inserted and fixed thereto, the thickness of the contact plate necessary for maintaining sufficient strength can be left on the base plate by stopping the grinding immediately before the marking dints disappear, and the faulty product is easily found out by the absence of the marking dints after grinding.

Reference is now made to FIGS. 17 and 18 showing a 3rd modification of the invention. In this modification, the base plate 3 comprises two portions, i.e., a small plate 3a of asbestos-filled synthetic resin in which stationary contact plates 2a, 2b and 2c are molded, and a large sector shaped plate 3b of synthetic resin which forms the main body of the base plate 3 and is of similar shape to one in the initial embodiment. The periphery of the small plate 3a is provided with a stepped portion 3a' which is integrally molded in the large plate 3b and secured to the latter at the inner edge 3b' formed in the large plate 3b.

In the manufacture of the base plate 3, the small plate 3a is molded, for example, from asbestos-filled melamine resin with the stationary contact plates 2a, 2b and 2c molded therein and with the step portion 3a' formed on the periphery thereof, while the large plate 3b having opening 6a for the hub 8 of the contact arm 7 (not shown) and holes, H for securing screws is formed, for example, by phenol resin or other thermoplastic or thermoset resins. While the large plate 3b is being molded, the small plate 3a formed as described above is inserted into the surface of the plate 3b with the stepped portion 3a filled in by the material of the plate 3b which forms corresponding stepped portion 3b', thus the former being rigidly secured in the latter to form the single base plate 3.

Conventionally, although the asbestos-filled synthetic resin forming the small plate 3a in which the stationary contact plates 2a, 2b and 2c are molded is suitable as an insulating plate for stationary contacts, having excellent arc extinguishing, heat-resistant and insulating properties, by which any spark generated on the plate is immediately distinguished with deterioration of the plate surface or curving of the plate effectively prevented, it is not very good in durability, having such defects as cracking at the periphery thereof or transformation of the plate with time, and especially the periphery portion of such plate can not be left as it is after molding.

In the above 3rd modification of the present invention, since the small plate 3a with good electrical properties is surrounded by the large plate 3b of ordinary synthetic resin without aging for an insulating material so as to form a single base plate as described above, the defects inherent in the asbestos-filled resin is advantageously eliminated with the small plate 3a reinforced at the periphery thereof and thus a base plate with much improved properties for an insulating plate of a switch of this kind is obtained.

Although the present invention has been fully described by way of example with reference to the attached drawings, it is to be noted that various changes and modifications are apparent to those skilled in the art. Therefore, unless otherwise such changes and modifications depart from the scope of the present invention, they should be construed as included therein.

What is claimed is:

1. A rotary switch of the sliding contact type comprising
a base plate of insulating material,
a plurality of concentric, arcuate rows of stationary contact plates secured at a surface of said base plate,
a rotary contact arm having a plurality of contacts, said rotary contact arm including a hub,
said hub including an axially projecting portion being threaded at the outer periphery thereof, and said hub having a rectangular bore extending therethrough, said hub projecting portion being formed with two intersecting grooves perpendicular to the sides of said rectangular bore, said two intersecting grooves extending through said projecting portion,
a rotatable shaft received in said hub, said rotatable shaft including a distal end portion having a rectangular cross-section, said distal end portion being inserted into said rectangular bore of said hub,
a tapered nut having a central rectangular bore, said tapered nut threadedly engaging the threaded outer periphery of said projecting portion of said hub, such that the inner faces of said rectangular bore of said projecting portion of said hub forcibly presses against said distal end portion, thereby firmly securing said rotatable shaft to said hub, and
a cover plate connected to said base plate for providing a cavity enclosing said rotary contact arm so that said contacts of said rotary contact arm slidably contact said stationary contact plates at positions corresponding to predetermined angles of rotation of said rotatable shaft.

2. A rotary switch of sliding contact type as claimed in claim 1, wherein each row of said stationary contact plates for said base plate is separately formed as a single plate by press stamping with neighboring individual stationary contact plates connected by narrow edges of openings formed between said neighboring contact plates, said narrow edges being cut off, after said single plate has been molded in said base plate, by making holes of larger diameters than the widths of said narrow edges so as to form independent stationary contact plates in said base plates.

3. A rotary switch of sliding contact type as claimed in claim 2, wherein said rows of said stationary contact plates are further provided with marking dints for detecting the cut depth of the surface of said stationary contact plates.

4. A rotary switch of sliding contact type as claimed in claim 3, wherein said base plate comprises a small plate of asbestos-filled synthetic resin in the surface of which said rows of stationary contact plates are molded, and a large plate of synthetic resin, said small plate being molded in said large plate as a single integral base plate.

5. A rotary switch of sliding contact type as claimed in claim 2, wherein said base plate comprises a small plate of asbestos-filled synthetic resin in the surface of which said rows of stationary contact plates are molded, and a large plate of synthetic resin, said small plate being molded in said large plate as a single integral base plate.

6. A rotary switch of sliding contact type as claimed in claim 1, wherein said rows of stationary contact plates are further provided with marking dints on the surface for detecting the cut depth of the surface, said marking dints being formed, in depths thereof, to be within the thickness of said stationary contact plates.

7. A rotary switch of sliding contact type as claimed in claim 6, wherein said base plate comprises a small plate of asbestos-filled synthetic resin in the surface of which said rows of stationary contact plates are molded, and a large plate of synthetic resin, said small plate being molded in said large plate as a single integral base plate.

8. A rotary switch of sliding contact type as claimed in claim 1, wherein said base plate comprises a small plate of asbestos-filled synthetic resin in the surface of which said rows of stationary contact plates are molded, and a large plate of synthetic resin, said small plate being molded in said large plate as a single integral base plate.

9. A rotary switch of sliding contact type as claimed in claim 1, wherein said two intersecting grooves are provided with different widths, the groove being parallel to the short sides of the rectangular cross-section of said rectangular bore being wider than the groove parallel to the long sides of said rectangular cross-section.

* * * * *